United States Patent [19]

Bodway

[11] 3,781,610

[45] Dec. 25, 1973

[54] THIN FILM CIRCUITS AND METHOD FOR MANUFACTURE

[76] Inventor: George E. Bodway, 23200 Mora Glen Dr., Los Altos, Calif.

[22] Filed: May 22, 1972

[21] Appl. No.: 255,890

Related U.S. Application Data

[62] Division of Ser. No. 56,610, July 20, 1970, abandoned.

[52] U.S. Cl. .............. 317/101 A, 317/256, 338/334

[51] Int. Cl. .............................................. H02b 1/04

[58] Field of Search ............................ 338/334, 309; 317/101 R, 101 A, 101 C, 261, 256; 204/15

[56] References Cited

UNITED STATES PATENTS

| | | | |
|---|---|---|---|
| 3,138,744 | 6/1964 | Kilby | 317/101 A |
| 3,221,223 | 11/1965 | Thunberg | 317/261 |
| 3,253,199 | 5/1966 | Cozens | 317/261 X |
| 3,308,528 | 3/1967 | Bullard | 338/309 X |
| 3,466,719 | 9/1969 | Sharif | 317/258 X |
| 3,607,679 | 9/1971 | Melroy | 317/258 X |
| 3,649,945 | 3/1972 | Waits | 338/309 |

*Primary Examiner*—E. A. Goldberg
*Attorney*—Roland I. Griffin

[57] ABSTRACT

A thin film capacitor and resistor circuit is disclosed, each capacitor being formed by a structure including a metallic film on an insulating substrate, the metallic film having an oxidized surface formed by anodizing, an oxide layer on the oxidized surface of the metallic film, and a pair of spaced-apart conductor layers over the oxide layer, each resistor being formed by a resistive film on the substrate and a pair of spaced-apart conductor layers connecting with the ends of the resistive film. In the manufacture of the circuit, a predeposited substrate is produced that may be utilized by circuit designers in the subsequent fabrication of custom microcircuits. A heat treating technique is employed in trimming the resistors of the circuit.

14 Claims, 7 Drawing Figures

PATENTED DEC 25 1973

3,781,610

THIN FILM CIRCUITS AND METHOD FOR MANUFACTURE

CROSS-REFERENCE TO RELATED APPLICATION

This is a divisional application of U.S. PAT. application Ser. No. 56,610 filed July 20, 1970, and now abandoned in favor of a continuation application, namely U.S. PAT. application Ser. No. 255,905 filed on May 22, 1972.

BACKGROUND OF THE INVENTION

The fabrication of electronic circuitry wherein resistors and capacitors and their interconnections are formed by thin-film techniques is growing rapidly in importance. With thin-film technology, a complex circuits having precision capacitors and resistors may be tailored to meet specific circuit design requirements, resulting in microcircuitry of reduced size, weight, and cost and increased reliability. One form of thin-film circuit, along with the method of manufacture, is disclosed in U.S. PAT. application Ser. No. 775,828 filed on Nov. 14, 1968, by George E. Bodway issued on Oct. 26, 1971, as U.S. PAT. No. 3,616,282; entitled METHOD OF PRODUCING THIN-FILM CIRCUIT ELEMENTS, and assigned to the same assignee as the present patent application.

One typical process for the manufacture of thin film resistor-capacitor circuits of the type shown in U.S. PAT. No. 3,616,282 comprises the following steps, performed sequentially:

1. Forming the under-electrodes of the various capacitors on an insulating substrate by
   a. sputtering a layer of conductive metal such as tantalum (Ta) over the surface of the substrate,
   b. forming a mask on the metal layer by a known photo-resist technique, and
   c. etching through the mask to remove all the metal except for the desired capacitor under electrodes and interconnections therebetween that serve to provide a single common electrical path for all the capacitor under-electrodes during a subsequent anodizing step;
2. Forming a dielectric layer over a portion of the surface of each of the capacitor under-electrodes by
   a. depositing an oxide layer over the entire surface of the substrate, capacitor under-electrodes, and interconnections, such as for example, by a silicon dioxide ($SiO_2$) deposition,
   b. forming a mask on the oxide layer by the photoresist technique,
   c. etching through the mask to remove the oxide layer from areas of the capacitor under-electrodes to be anodized,
   d. electrochemically anodizing the exposed portions of the capacitor under-electrodes in an appropriate electrolyte for an appropriate period of time to form the desired dielectric layer (for example, $Ta_2O_5$) of each capacitor under-electrode, and
   e. removing the anodizing mask by an oxide etch, leaving the partially anodized under-electrodes and the interconnections therebetween;
3. Removing the interconnections between the capacitor under-electrodes by
   a. forming a mask by the photoresist technique, leaving the interconnections exposed, and
   b. etching away the interconnections;
4. Forming the various resistors on the substrate by
   a. sputtering a layer of resistive material such as tantalum nitride ($Ta_2N$) over the entire surface of the substrate and capacitor electrodes,
   b. depositing a first layer of conductive material such as chrome gold (CrAu), which adheres well to the resistive layer, over the resistive layer,
   c. forming a mask, which covers those areas of the structure where the resistors are to remain, by the standard photoresist process, and
   d. etching away the exposed first conductive layer and the underlying resistive layer, leaving the desired resistors of
5. In order to increase the yield of these circuits, depositing an additional oxide layer on the dielectric layer of each capacitor under-electrode ($ta_2O_5$) to cure pinholes therein and other imperfections produced therein during the various fabrication steps performed after the anodizing step, such as during the oxide etching step of 2(e) above and the resistive-layer sputtering step of 4(a) above, this step is performed, for example by depositing a layer of silicon dioxide ($SiO_2$) over the structure with a value of 0.055 pf/mil$^2$ ± 5% for the combined $Ta_2O_5$ and $SiO_2$ film.
6. Forming the upper-electrodes of the various capacitors by
   a. depositing a second layer of conductive material such as chrome gold (CrAu) over the entire surface of the structure,
   b. forming a mask, which covers those areas of the structure where the capacitor upper-electrodes and the underlying additional oxide layer are to remain, by the photoresist technique, and
   c. etching away the exposed second conductive layer and then the underlying additional oxide layer, leaving the desired capacitor upper-electrodes;
7. Completing the upper-electrodes of the various capacitors and forming and the inter-connections between the various capacitors and resistors by
   a. depositing a third layer of conductive material such as chrome gold (CrAu) over the entire surface of the structure,
   b. forming a mask on the third conductive layer by the photoresist technique to define the capacitor upper-electrodes and interconnections,
   c. plating a thick layer (0.30–0.40 mils) of gold to form the interconnections, and
   d. etching away the second and then the third conductive layers where not covered by the thick gold interconnections.

It is noted that, in the above process, certain difficult steps are performed. For example, the masking and anodizing steps of 2(b), (c), and (d) above are troublesome since, during anodizing, the mask has to withstand 200 volts in an electrolytic bath, and the mask offtentimes breaks down.

Other difficult steps in the process are the interconnection masking and etching steps of 3(a) and (b) above. Still other difficult steps in the process are the masking and etching steps of 6(b) and (c), particularly since the mask formed must be pinhole free to prevent pinholes from being etched in the capacitor dielectric layers. The etching step of 6(c) requires the use of a silicon dioxide in forming the additional oxide layer, since it is difficult or impossible to etch other forms of oxide layers, and only silicon dioxide has been found to be satisfactory.

Since a photoresist mask alone is not capable of withstanding the oxide etch needed to form the capacitors in the etching step of 6(c), the layer of CrAu deposited during the step of 6(a) is needed to serve as a mask, and thus the two layers of CrAu deposited during the steps of 6(a) and 7(a) and the two subsequent CrAu etching steps of 6(c) and 7(d) are needed.

Also, where silicon oxide layers are selectively etched and remaining portions thereof are subsequently gold plated through a masking, there is a tendency for an undesirable gold bead to form around the upper edges of the masked portions of the oxide layers, the mask being unable to adequately protect these edges.

Because of the high temperatures involved in the $SiO_2$ deposition step of 5 above, it is necessary that the first layer of CrAu deposited in the step of 4(b) above be fairly thick so as not to be deleteriously affected by diffusion of chrome therefrom due to the heat. Consequently, the etching step of 4(d) above is lengthened resulting in less than optimum resistor definition.

The above process requires seven masking steps, and the trips between the photoresist masking stages and the subsequent deposition and etching stages result in an overall fabrication period of approximately three weeks.

SUMMARY OF THE INVENTION

The principal object of the present invention is to provide a novel thin film resistor-capacitor network structure and method for fabricating the structure resulting in very high manufacturing yield.

Each capacitor is formed by fabricating two capacitance elements in series, with a metal under-electrode serving as the junction between the two series capacitance elements, and with two external connections to the capacitor being formed over the dielectric layer of the capacitor. In this manner, a number of troublesome steps in the prior fabrication process are avoided.

Since no external connections are to be made with the capacitor under-electrodes, the total surface area of the capacitor under-electrodes is anodized, and no anodizing mask is needed, eliminating the mask breakdown problem mentioned above. After anodizing, the complete surface of the substrate and capacitor under-electrodes is coated with a layer of oxide which, along with the anodized region of each capacitor under-electrode, serves as the dielectric for each capacitor. This oxide layer is followed by a layer of resistive material, which serves to form the resistors, and then by a layer of conductive material. The resistors and capacitors may thereafter be formed on this substrate by straightforward masking, etching, and conductor deposition steps set forth in detail below.

In this novel structure, the capacitor under-electrodes are positioned peripherally around the substrate surface, and the interconnections between these electrodes are all formed near the outer edges of the substrate. Thus, after the electrode anodizing step in the fabrication of the structure, the interconnections may be removed by sawing off the edge areas of the wafer. This eliminates the need for the interconnection mask and etching steps of 3(a) and (b) above.

Since the two external connections to each capacitor are made on the top surface thereof and since there is no need to make an external connection to the capacitor under-electrodes, the entire surface area of each capacitor under-electrode may be anodized and then covered by the oxide layer to form the dielectric layers of each capacitor without etching. Thus, the difficult oxide etching step of 6(c) above, as well as the formation of the pinhole-free mask in the step of 6(b) above are eliminated, resulting in a pinhole-free oxide layer. Elimination of the need for this oxide etching step permits the use of a wider range of oxides for the dielectric layer, with their possible advantageous dielectric characteristics, including oxides which cannot be etched.

Only one CrAu layer is needed rather than two or more as in the previous process, and, as a result, only one CrAu etch is used. In addition, the CrAu layer need not be thick, since it is not subsequently subjected to the heat of an $SiO_2$ deposition, and thus resistor geometry may be optimized.

This new fabrication technique employs more than one-third fewer process steps, including three less masking steps. There are only three trips between the photoresist masking stages and the subsequent deposition and etching stages rather than six trips as in the prior process, and the total fabrication time has been cut from three weeks to one week. The capacitor yield of the improved structures has been increased to nearly 100 percent. This improved technique therefore makes it economical to use thin film resistor-capacitor structures even when an integrated circuit uses only two or three capacitors.

The new fabrication technique leads to a general purpose predeposited substrate structure that may then be distributed to circuit designers for their individual use in creating new circuits. This predeposited substrate structure comprises a plurality of anodized capacitor under-electrodes spaced around the periphery of the substrate (the interconnections used for anodizing are sawed off). The oxide dielectric layer for the capacitors, the layer of resistive material, and the thin conductor layer of chrome gold are all included on the standard structure given to the circuit designer. These early fabrication stages involve the most expensive manufacturing equipment, generally not available to circuit designers. However, the equipment needed to perform the remaining steps in the formation of a capacitor-resistor network is available to most circuit designers, permitting them to design and manufacture many diverse forms of circuits from the standard substrate structure.

DESCRIPTION OF THE PREFERRED EMBODIMENTS

Figures 1, 2, 3, 4, 5, 6, 7:
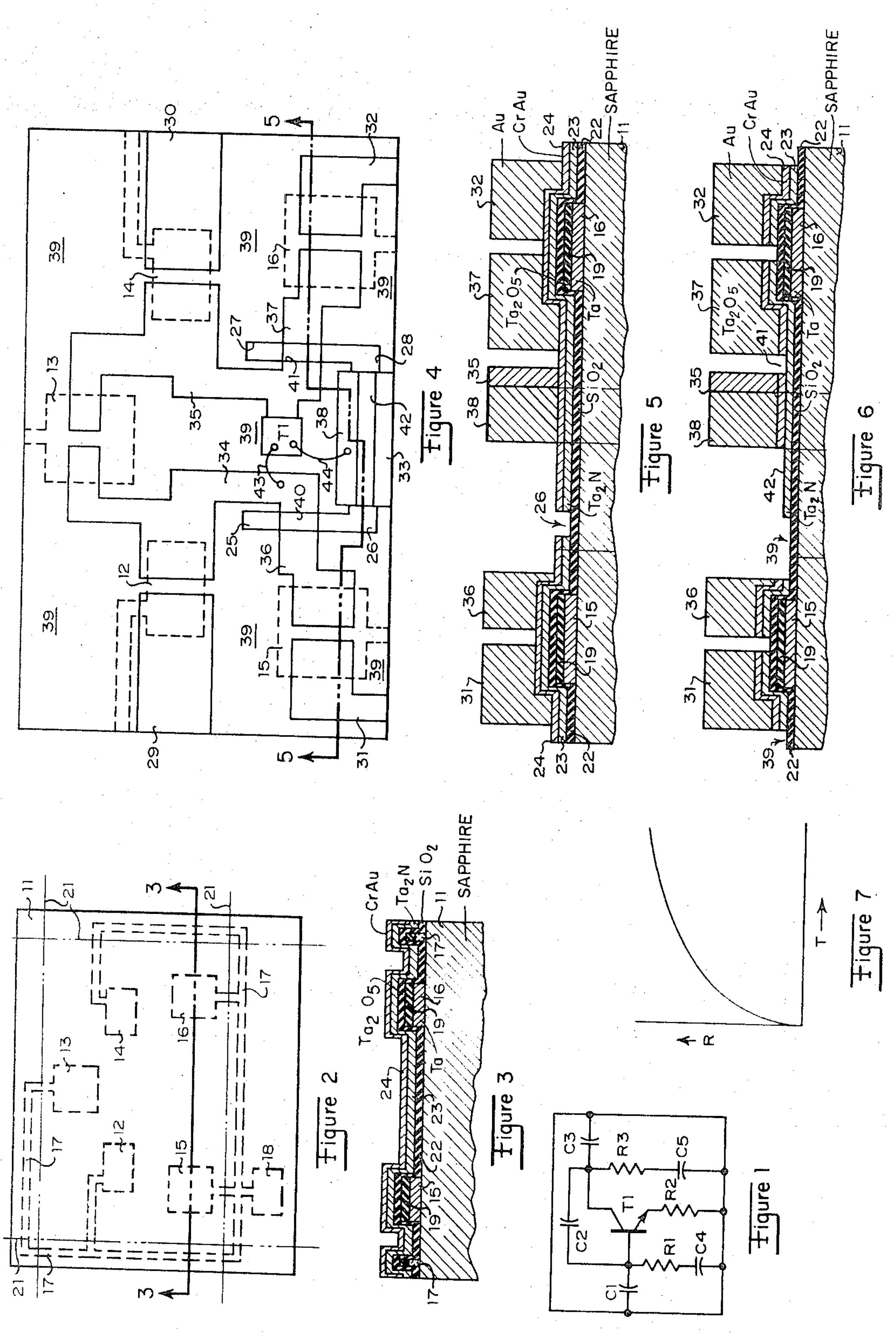
FIG. 1 is a schematic diagram of a thin film resistor and capacitor structure made in accordance with the preferred embodiment of the present invention.
FIG. 2 is a top view of the thin film of FIG. 1 in an early stage of its fabrication.
FIG. 3 is a cross-sectional side view of the thin film structure of FIG. 2 taken along section line 3—3 therein.
FIG. 4 is a top view of the thin film structure of FIG. 1 in an advanced stage of its fabrication.
FIG. 5 is a cross-sectional side view of the thin film structure of FIG. 4 taken along section line 5—5 therein.
FIG. 6 is a similar cross-sectional side view of the thin film structure of FIG. 4 in a still later stage of fabrication.
FIG. 7 is a curve illustrating the relationship between resistance value and heat treatment time for the resistors formed in the thin film structure of FIG. 1.

In order to more clearly describe the present invention, the step-by-step construction of a simple amplifier circuit shown in FIG. 1 will be described in detail. This simple circuit comprises a transistor T1 coupled to a thin film resistor-capacitor structure comprising three resistors R1, R2, and R3 and five capacitors C1 through C5.

Referring now to FIGS. 2 and 3, the main body or support for the structure comprises a substrate 11 of good insulating material, such as sapphire, glass or ceramic, and of a suitable size, such as one-half inch wide, 1 inch long, and 25 mils thick. After proper cleaning, the upper surface of the substrate is deposited with a layer of good electrical conducting material on which a dielectric oxide layer may be anodically formed. This layer is preferably beta tantalum or hafnium of suitable thickness, for example 7,000 to 9,000 A; Other suitable materials include aluminum, niobium, titanium and zirconium. This layer may be deposited by a number of suitable processes including cathodic sputtering and vacuum deposition.

The metallic layer deposited on substrate 11 is masked by a known photoresist technique and then etched to produce a plurality of metallic electrodes 12-16, which are to serve as the under-electrodes of the capacitors C1 through C5, respectively. These electrodes may be formed by techniques other than the photoresist masking technique. For example, ion beam machining may be employed. At the time these electrodes are formed, interconnecting strips 17 and a common metallic pad 18 are also formed, the pad 18 and the interconnecting strips 17 forming a common electrical connection for the electrodes during the subsequent anodizing process.

A layer of good dielectric material is then formed on the entire surface area of each electrode by anodizing the metallic electrodes in an appropriate electrolyte, such as about 0.01% solution of citric acid at about 200 volts for one hour, resulting in the formation of an oxide layer 19 on the upper surface of each electrode. In the case of a tantalum electrode, a layer of tantalum pentoxide ($Ta_2O_5$) is formed;, and in the case of a hafnium electrode, a layer of hafnium oxide ($HfO_2$) is formed. This layer is on the order of several thousand Angstrom units thick. Once the anodizing has been completed, the pad 18 and the interconnecting strips 17 for the electrodes 12–16 may be eliminated from the structure by sawing the substrate 11 along the lines 21 shown in FIG. 2. This sawing step may be postponed until after the structure has been completely fabricated, if desired.

An oxide layer 2 is then formed over the entire surface of the substrate 11 and the anodized electrodes 12–16. For example, silicon dioxide ($SiO_2$) may be sputtered onto the surface to a selected thickness, (for example, 2500 A) to give the desired capacitance density;. Silicon dioxide will give a capacitance density of 0.055 pf/mil$^2$. The thickness of the silicon dioxide layer may be accurately controlled within ±2%, and thus the value of the capacitors formed may be very accurately controlled. Since, in this invention, it is not necessary to etch the oxide layer 22 during subsequent steps in the process, many oxides can be selected, for example, hafnium dioxide, silicon nitride, aluminum oxide, yttrium oxide and tantalum pentoxide, to give different dielectric constants and different capacitance densities ranging from 0.05 to 0.55 pf/mil$^2$. The oxide layer 22 will generally have a thickness in the range from the order of 2,000 A to 10,000 A. The oxide layers 22 is preferably formed by sputtering, but may be applied by other techniques, such as gaseous deposition and electron beam deposition.

A layer 23 of good resistive material is then applied over the oxide layer 22, for example, an 800 A thick layer of tantalum nitride ($Ta_2N$) is applied by reactive sputtering. Other resistive materials, such as nichrome, hafnium nitride, and rhenium, may be selected for use, and may be applied by suitable techniques, including sputtering and evaporation. As is well known, the thickness of the resistive layer 23 will vary depending on the value of the ohms per square desired; generally the thickness will range from 200 A to several thousand A. Typically, a 30 or 50 ohms/square resistive layer 23 is utilized. The sheet resistivity is established at a lower value than the desired ultimate value, the end value being produced by trimming the resistors as described below. The nominal resistivity range for the a 30 ohms/square layer is, for example 24.0 – 26.5 ohms/square and that for the 50 ohms/square layer is 39.0 – 42.0 ohms/square.

An electrically conducting metal layer 24, preferably of chrome gold (CrAu), is then applied by any suitable technique, such as sputtering or evaporation. The metal layer 24 may also be formed of moly gold, nickel gold, or copper and may be formed to a suitable thickness (for example, several thousand Angstrom units) giving about 0.1 ohm per square.

At this stage in the fabrication, a form of standard, general purpose predeposited substrate structure has been fabricated. In our example, only five capacitor under-electrodes have been provided, but a much larger number are fabricated on the general purpose substrate, the electrodes being of various area sizes and ranging around the periphery of the substrate. The large central portion of the substrate is available for creating the various resistors and the circuit interconnections, as well as providing room for bonding transistors to the structure. Any desired ones of the various capacitor under-electrodes may be used in the subsequent circuit fabrication.

These general purpose structures are given to circuit designers for their use in creating innumerable circuits. Since the process apparatus necessary to perform the remaining steps in the fabrication of such circuits is generally available to circuit designers, custom design is greatly facilitated.

The next operation in the fabrication of the illustrative structure of FIG. 1 is to define the width of the resistor elements by a photoresist masking and an etch of both the CrAu layer 24 and the $Ta_2N$ resistive layer 23 down to the surface of the $SiO_2$ layer 22 to form openings 25, 26, 27, and 28 (see FIGS. 4 and 5). Openings 25 and 26 define the width of resistor R1 therebetween; openings 27 and 28 define the width of resistor R3 therebetween; and openings 26 and 28 define the width of resistor R2 therebetween.

As is well known, the value of resistance R of the resistors, given a particular sheet resistivity, is determined by the length L and the width W thereof, where $R \alpha L/W$. For high resistance, the resistor is long and narrow, generally taking a sinuous shape. In our illustration, the resistors are of relatively small value and are therefore shorter in length than width.

As a next stage of fabrication, the upper electrodes of the capacitors, the desired interconnections between the circuit elements, and the external connection pads are then plated through a suitable mask onto the CrAu layer 24. A conductive material, such as gold or copper, is used and deposited to a desired thickness (for example, one-quarter mil) As seen in FIG. 4, conductors 29, 30, 31, and 32 serve as external connectors for the capacitors C1, C3, C4, and C5, respectively; conductor 33 serves as the external connector for resistor R2, conductor 34 serves to interconnect one side of capacitor C2 with capacitor C1 and resistor R1; conductor 35 interconnects the other side of capacitor C2 with capacitor C3 and resistor R3; conductor 36 interconnects capacitor C4 and resistor R1; conductor 37 interconnects capacitor C5 and resistor R3; and conductor 38 serves as the connector between resistor R2 and the transistor T1 to be thereafter bonded to the structure.

The value of each is established by the extent of the two regions sandwiched directly between the two upper-electrodes and the under-electrode, for example, in the case of capacitor C1, the region directly between the under-electrode 12 and the two upper-electrodes 29 and 34. The overlaid area of under-electrode 13 is of capacitor C2 is smaller than that for the other capacitors, and the capacitance of capacitor C2 is therefore substantially smaller than that of the other four capacitors. Each capacitor is formed, in effect, by two capacitors connected in series. For example, capacitor C1 is formed by the capacitance between 29 and upper-electrode under-electrode 12 plus the capacitance between upper-electrode 34 and under-electrode 12. The electrical connections to this capacitor are both made to the upper electrodes 29 and 34, and no external connections are made with the under-electrode 12.

As mentioned above, the resistors of this circuit are low in value and, therefore, the length of the resistors is short. Resistor R2 is smaller in value than resistors R1 and R3 and is therefore wider.

As a next stage of fabrication, the CrAu layer 24 and then the resistive $Ta_2N$ layer 23 are removed from all areas 39 between and around the various circuit elements by employing photoresist and etching techniques. Thereafter, the layer 24 of CrAu is removed by etching, from the areas 40, 41, and 42, leaving the layer of resistive material ($Ta_2N$) to form the resistors R1, R3, and R2, respectively, in these areas (see FIG. 6).

The resistors are now stabilized by placing the substrate in an oven at 425° ±3°C for a suitable period of time (for example, 10 min. ±10 sec).

As mentioned above, the sheet resistivity of the resistors was made lower than the desired ultimate value. The resistors are now brought up to final value by trimming. In one known method for raising the resistor value, an electrolyte is spread over the resistors, and they are then trim anodized to raise them to within the lower and upper permissible limits.

A resistor trimming technique, eliminating the need for anodizing, is utilized in this invention. The sheet resistivity may be raised by heat treating the resistors. For a given starting resistance, the resistors will increase in value proportionally to the length of time of the heat treatment. A typical curve illustrating the relationship between resistance R and heat treatment time T is shown in FIG. 7. As shown by this curve, the resistance rises in a linear fashion during the earlier stage of the heat treatment and tends to level off later in the heat treatment. For any particular resistor, the starting resistance may be measured and, from the curve of FIG. 7, the heating time necessary to raise the resistor value to within acceptable limits may be determined. The time range for each resistor on the substrate may be determined, and common time length needed to bring all the resistors within range may be selected. For example, the length of the heat treatment time which will first bring one of the plurality of resistors to its maximum allowable resistance value is determined. This will be the maximum allowable time for trimming all the resistors. The length of heat treatment time needed to bring the last one of the resistors just over its minimum allowable resistance value is determined. This will be the minimum allowable time for the trimming. The proper heat treatmtnt time will lie between these two limits. By using the formula of the trimming curve of FIG. 7 and supplying the starting resistor values, all the computations necessary to determine a desired heat treatment time may be performed by a computer, thereby significantly decreasing the fabrication time for these networks. As an example, the oven is heated to 425°C ±3°C and the substrate, or substrates if more than one is being trimmed, are treated for from 10 minutes to 60 minutes, depending on the computed treatment time for the particular one or more substrates.

After final test of the circuit, the transistor T may be bonded to the conductor 35 so that the collector electrode is coupled to the junction of capacitors C2, C3, and R3. Electrical lead 43 is added to connect the base electrode to conductor 34 between capacitors C1 and C2 and resistor R1, and electrical lead 44 is added to connect the emitter electrode with connector 38 for resistor R2.

I claim:

1. A predeposited structure on which thin film capacitors and resistors may be formed and interconnected, said predeposited structure comprising:
- a substrate of insulating material;
- a plurality of metallic film elements on said substrate, said metallic film elemets having oxidized upper surfaces;
- an oxide layer extending over said substrate and the oxidized upper surfaces of said metallic film elements;
- a layer of resistive material extending over said oxide layer; and
- a layer of conductive material extending over said layer of resistive material.

2. A predeposited structure as in claim 1 wherein said metallic film elements are tantalum film elements having tantalum pentoxide upper surfaces, and wherein said layer of resistive material is a layer of tantalum nitride.

3. A predeposited structure as in claim 1 wherein said metallic film elements are hafnium film elements having hafnium oxide upper surfaces, and wherein said layer of resistive material is a layer of tantalum nitride.

4. An integrated circuit structure including interconnected thin film capacitor elements and resistor elements, said integrated circuit structure comprising:
- a substrate of insulating material;
- each of the capacitor elements of said integrated circuit structure being formed on one surface of said substrate and including a metallic film element on said one surface of said substrate, said metallic film element having an oxidized upper surface, a portion of an oxide layer on said oxidized upper surface of said metallic film element, and a pair of spaced-apart upper plate elements on said portion of said oxide layer over said metallic film element to define a pair of connections for the capacitor element, each of said upper plate elements comprising a portion of a layer of resistive material on said portion of said oxide layer over said metallic film element, a portion of a first layer of conductive material over said portion of said layer of resistive material, and a portion of a second layer of conductive material over said portion of said first layer of conductive material;

each of the resistor elements of said integrated circuit structure being formed on said one surface of said substrate and including a portion of said oxide layer on said substrate, a portion of said layer of resistive material on said last-mentioned portion of said oxide layer, and a pair of spaced-apart upper terminal elements on said last-mentioned portion of said layer of resistive material to define a pair of connections for the resistor element, each of said upper terminal elements comprising a portion of said first layer of conductive material over said last-mentioned portion of said layer of resistive material, and a portion of said second layer of conductive material over said last-mentioned portion of said first layer of conductive material; and said second layer of conductive material being extended in selected patterns over said integrated circuit structure to interconnect selected ones of said connections for the capacitor and resistor elements of said integrated circuit structure.

5. A thin film structure including at least one capacitor and one resistor, said structure comprising:

a substrate of insulating material;

at least one conductive metallic film element on said substrate, said conductive metallic film element having an oxidized upper surface;

an oxide layer extending entirely over said substrate and the oxidized upper surface of said conductive metallic film element;

a pair of spaced-apart conductive plate elements on said oxide layer over the oxidized upper surface of said metallic film element to form a pair of connections for said capacitor;

at least one resistive film element on said oxide layer; and a pair of spaced-apart conductive terminal elements on said resistive film element to form a pair of connections for said resistor.

6. A thin film structure as in claim 5 wherein said conductive metallic film element has its entire upper surface oxidized.

7. A thin film structure as in claim 6 wherein:

said conductive metallic film element is a tantalum film element having a tantalum pentoxide upper surface;

said oxide layer is a silicon oxide layer; and said layer of resistive material is a layer of tantalum nitride.

8. A thin film structure as in claim 6 wherein:

said metallic film element is a hafnium film element having a hafnium oxide upper surface;

said oxide layer is a silicon oxide layer; and said layer of resistive material is a layer of tantalum nitride.

9. A predeposited structure from which thin film capacitors and resistors may be formed and interconnected, said predeposited structure comprising:

a substrate of insulating material;

a plurality of spaced metallic film elements formed on said substrate, each of said metallic film elements having an oxidized upper surface;

an oxide layer formed on and extending entirely over said substrate and the oxidized upper surfaces of said metallic film elements;

a layer of resistive material formed on and extending over said oxide layer; and a layer of conductive material formed on and extending over said layer of resistive material.

10. A predeposited structure as in claim 9 wherein:

each of said metallic film elements has its entire upper surface oxidized;

said layer of resistive material extends entirely over said oxide layer; and said layer of conductive material extends entirely over said layer of resistive material.

11. A predeposited structure as in claim 10 wherein:

each of said metallic film elements in a tantalum film element having a tantalum pentoxide upper surface;

said oxide layer is a silicon oxide layer; and said layer of resistive material is a layer of tantalum nitride.

12. A predeposited structure as in claim 11 wherein:

said layer of conductive material is a layer of chrome gold.

13. A predeposited structure as in claim 10 wherein:

each of said metallic film elements is a hafnium film element having a hafnium oxide upper surface;

said oxide layer is a silicon oxide layer; and said layer of resistive material is a layer of tantalum nitride.

14. A predeposited structure as in claim 13 wherein said layer of conductive material is a layer of chrome gold.

* * * * *

UNITED STATES PATENT OFFICE
CERTIFICATE OF CORRECTION

Patent No. 3,781,610 Dated December 25, 1973

Inventor(s) George E. Bodway

It is certified that error appears in the above-identified patent and that said Letters Patent are hereby corrected as shown below:

Column 1 of the Title Page, between "[76]" and "[22]" insert -- [73] Assignee: Hewlett-Packard Company, Palo Alto, California --;

Column 1, line 14, delete "a"; line 20, change "application" to read -- Application --; and line 37, change "under electrodes" to read -- under-electrodes --;

Column 2, line 7, change "standard photoresist process" to read -- photoresist technique --; line 10, delete "of" and substitute a semicolon; line 12, after "dielectric" insert -- ($Ta_2O_5$)--; line 13, delete "($ta_2O_5$)"; line 18, change "this" to read -- (this --; line 22, delete "film" and substitute -- layers) --; line 36, delete "and" (second occurrence), and change "inter-connections" to read -- interconnections --;

Column 3, line 7, change "masking" to read -- mask --;

Column 4, line 63, after "of" insert -- its --;

Column 5, line 60, "sity;" should read -- sity -- ; line 62, insert a comma before and after "thus";

Column 6, line 5, "layers" should read -- layer -- ; line 11, cancel "is"; line 17, "desired; generally" should read -- desired. Generally -- .

UNITED STATES PATENT OFFICE

CERTIFICATE OF CORRECTION

Patent No. 3,781,610 Dated December 25, 1973

Inventor(s) George E. Bodway (Cont.)

It is certified that error appears in the above-identified patent and that said Letters Patent are hereby corrected as shown below:

Column 7, line 13, change "serves to interconnect" to read -- interconnects --; line 21, after "each" insert -- capacitor --; line 26, delete "is"; line 32, after "between" insert -- upper-electrode --; lines 32 and 33, delete "upper-electrode"; and line 46, after "removed" insert a comma.

Signed and sealed this 6th day of August 1974.

(SEAL)
Attest:

McCOY M. GIBSON, JR.
Attesting Officer

C. MARSHALL DANN
Commissioner of Patents